(12) United States Patent
Koo

(10) Patent No.: US 7,969,738 B2
(45) Date of Patent: Jun. 28, 2011

(54) COMPUTER

(75) Inventor: Kyung-ha Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 11/865,773

(22) Filed: Oct. 2, 2007

(65) Prior Publication Data

US 2008/0232063 A1 Sep. 25, 2008

(30) Foreign Application Priority Data

Mar. 21, 2007 (KR) ........................ 10-2007-0027516

(51) Int. Cl.
*H05K 7/20* (2006.01)
(52) U.S. Cl. ... 361/701; 361/688; 361/700; 165/104.33; 136/211; 62/3.7
(58) Field of Classification Search ............ 361/679.52, 361/695, 698, 699, 679.46–679.48, 688–690, 361/700–704
See application file for complete search history.

(56) References Cited

U.S. PATENT DOCUMENTS

| 6,038,128 | A | 3/2000 | Hood, III et al. |
| 6,226,994 | B1* | 5/2001 | Yamada et al. ................. 62/3.7 |
| 6,778,390 | B2* | 8/2004 | Michael ........................ 361/695 |
| 2003/0058615 | A1 | 3/2003 | Becker et al. |
| 2003/0183269 | A1* | 10/2003 | Maeda et al. ................ 136/211 |
| 2004/0105233 | A1* | 6/2004 | Lai ................................ 361/695 |
| 2007/0097643 | A1* | 5/2007 | Cheng ........................... 361/700 |

FOREIGN PATENT DOCUMENTS

| JP | 2000-347770 | 12/2000 |
| JP | 2001-68883 | 3/2001 |
| KR | 1999-76321 | 10/1999 |

* cited by examiner

*Primary Examiner* — Jayprakash N Gandhi
*Assistant Examiner* — Courtney Smith
(74) *Attorney, Agent, or Firm* — Stanzione & Kim, LLP

(57) ABSTRACT

A computer includes a casing in which an opening is formed, a heat generating element which is provided inside of the casing, a main cooling unit which is disposed between the opening of the casing and the heat generating element and cools heat which is generated from the heat generating element, and an auxiliary cooling unit which is provided inside of the casing and additionally cools inside air directed to the main cooling unit.

38 Claims, 6 Drawing Sheets

COMPUTER

CROSS-REFERENCE TO RELATED APPLICATIONS

This application claims priority under 35 U.S.C. §119(a) from Korean Patent Application No. 10-2007-0027516, filed on Mar. 21, 2007 in the Korean Intellectual Property Office, the disclosure of which is incorporated herein in its entirety by reference.

BACKGROUND OF THE INVENTION

1. Field of the Invention

The present general inventive concept relates to a computer, and more particularly, to a computer having an improved structure to cool heat which is generated from a heat generating element.

2. Description of the Related Art

In general, a cooling unit which includes a fan is installed in a computer so as to prevent breakdown of an electronic circuit due to heat generated from a heat generating element.

In this description, computers may include computers such as desktop computers, laptop computers, and the like. A laptop computer will be hereinafter described by way of example.

Referring to FIG. 1, a conventional computer includes a computer body 10 and a display (not illustrated) which is rotatably coupled to the computer body 10 and forms a picture.

The computer body 10 includes a casing 20 having an opening 20a, a circuit board 30 which is accommodated inside of the casing 20, a heat generating element 40 which is coupled to the circuit board 30, and a cooling unit 50 which is disposed between the opening 20a and the heat generating element 40 and cools heat which is generated from the heat generating element 40.

The cooling unit 50 includes a fan 51, a heat radiating fin 52 which is coupled to the fan 51 and exposed to the opening 20a and a heat pipe 53 which is disposed between the heat radiating fin 52 and the heat generating element 40 and guides the heat which is generated from the heat generating element 40.

However, in the conventional computer, as a system thereof operates, temperature of air which is provided to the cooling unit 50 is increased by other heat generating elements or temperature of air which is provided to the cooling unit 50 is not lower than a room temperature of the place where the computer is used, thereby deteriorating a cooling performance of the cooling unit 50.

Further, the capacity of the cooling unit 50 should be increased so as to minimize deterioration of the cooling performance, and thus, the size of the cooling unit 50 is enlarged and noises generated due to rotation of the fan 51 are increased.

Furthermore, as the cooling performance of the cooling unit 50 deteriorates, stability of the computer system may be weakened.

SUMMARY OF THE INVENTION

The present general inventive concept provides a computer with an improved cooling performance by additionally cooling air inside of the computer to a temperature lower than a room temperature of the place where the computer is used.

The present general inventive concept also provides a computer which has a cooling unit minimized in size and can decrease noises through the improved cooling performance.

The present general inventive concept also provides a computer with an improved stability of a system thereof through the improved cooling performance.

Additional aspects and utilities of the present general inventive concept will be set forth in part in the description which follows and, in part, will be obvious from the description, or may be learned by practice of the general inventive concept.

The foregoing and other aspects and utilities of the present general inventive concept can be achieved by providing a computer comprising a casing in which an opening is formed, a heat generating element which is provided inside of the casing, a main cooling unit which is disposed between the opening of the casing and the heat generating element and cools heat which is generated from the heat generating element, and an auxiliary cooling unit which is provided inside of the casing and additionally cools inside air directed to the main cooling unit.

The auxiliary cooling unit may comprise a heat absorbing member which exchanges heat with the inside air of the casing, and a cooling element which is coupled with the heat absorbing member and cools the inside air of the casing.

The auxiliary cooling unit may further comprise a heat radiating member which include a plurality of fins and is coupled to the heat absorbing member.

The heat absorbing member may comprise a heat absorbing plate having a plate shape.

The cooling element may comprise a peltier element.

The peltier element may comprise a heat absorbing surface which comes in contact with the heat absorbing member and absorbs heat from the heat absorbing member, and a heat radiating surface of which at least a part is exposed to the outside of the casing and radiates heat, and the computer may further comprise a power supply which supplies power to the peltier element.

The computer may further comprise a sensing unit which senses a temperature of the heat radiating surface, and a controlling unit which controls the power supply so that the temperature of the heat radiating surface can be maintained within a reference temperature on the basis of the sensed temperature from the sensing unit.

The auxiliary cooling unit may further comprise a heat sink which is coupled to the heat radiating surface of the cooling element.

The main cooling unit may comprise a fan, a heat radiating fin which is coupled with the fan and exposed through the opening, and a heat pipe which is disposed between the heat radiating fin and the heat generating element and guides heat which is generated from the heat generating element to the heat radiating fin.

The auxiliary unit may be disposed in a space between the main cooling unit and the casing.

The computer may comprise a portable computer.

The foregoing and/or other aspects and utilities of the present general inventive concept are also achieved by providing a computer, comprising a casing to support a heat generating element, the casing defining at least one fan opening a main cooling unit, comprising a fan to exchange air inside the casing with air outside the casing through the at least one fan opening, a heat pipe connected to the heat generating element to conduct heat away therefrom, and a heat radiating fin coupled to the heat pipe to radiate the conducted heat, and an auxiliary cooling unit, comprising a heat absorbing member to absorb a heat of the air inside the casing, and a cooling member to cool the air inside the casing.

The cooling member can be a peltier element connected to the heat absorbing member.

The computer may further comprise a power supply to provide power to the auxiliary cooling unit, and a controller, wherein the controller controls a power supplied to the auxiliary unit to prevent formation of condensation due to overcooling by the cooling member.

The controller may control the power supplied to the auxiliary unit according to a predetermined reference temperature.

The controller may control the power supplied to the auxiliary unit according to a predetermined reference voltage or current.

The auxiliary cooling unit may further comprise a heat radiating member connected to the heat absorbing member to radiate a heat therefrom, and a heat sink connected to the cooling member and having at least a portion exposed to an outside of the casing, to cool heat off the cooling member.

The heat generating element may be a circuit board or an element thereof.

The auxiliary cooling unit may be disposed on an air path of the main cooling unit and the at least one fan opening.

The auxiliary cooling unit may be disposed such that it cools an air entering the fan of the main cooling unit.

The auxiliary cooling unit may be disposed such that it cools an exiting the fan towards an inside of the casing.

The main cooling unit may introduce air from an outside of the casing and toward the heat generating unit, and may radiate heat away from the heat generating element through the heat pipe and heat radiating pin.

The auxiliary cooling unit may absorb a heat of the inside air through the heat absorbing member, and may cool the inside air through the cooling member by a peltier effect.

The computer may further comprise a sensor to sense a temperature of the auxiliary cooling unit, wherein the controller may control the power supplied to the auxiliary cooling unit according to a comparison of the sensed temperature and the predetermined reference temperature.

The computer may further comprise a sensor a sensor to sense generation of condensation on the cooling member, and the controller may reduce the power supplied to the auxiliary cooling unit if condensation is detected.

The foregoing and/or other aspects and utilities of the present general inventive concept are also achieved by providing a computer, comprising a casing, a heat generating element disposed within the casing, a first cooling unit to cool the heat generating element, and a second cooling unit to cool an air inside the casing according to a temperature inside of the casing.

The casing may comprise an opening and the first cooling unit may control air inside the casing to communicate with air outside the casing through the opening.

The second cooling unit may not be disposed on a flow path of the inside air between the opening and the heat generating element.

The first cooling unit may operate according to an operation of the heat generating element, and the second cooling unit may selectively operate according to the temperature.

The temperature may comprise at least one of an inside temperature, a temperature of the second cooling unit, and a comparison thereof.

BRIEF DESCRIPTION OF THE DRAWINGS

These and/or other aspects and utilities of the present invention will become apparent and more readily appreciated from the following description of the embodiments, taken in conjunction with the accompanying drawings of which.

DETAILED DESCRIPTION OF THE PREFERRED EMBODIMENTS

Figure 1:
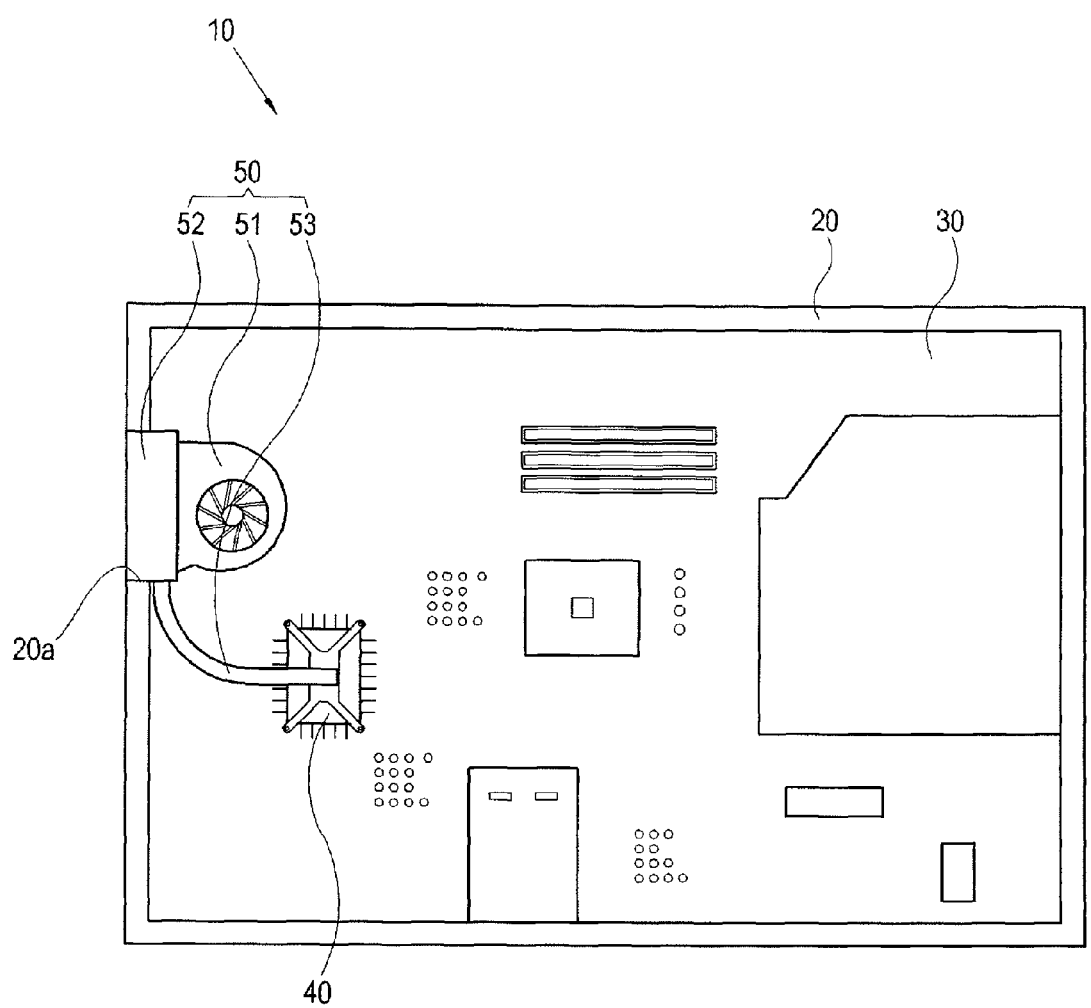
FIG. 1 is a plane view illustrating an inside of a conventional computer body.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As illustrated in FIGS. 2 to 5, a computer 100 according to the present general inventive concept may include a display 110 to display images and a computer body 120 which is coupled to the display 110.

Figure 4:
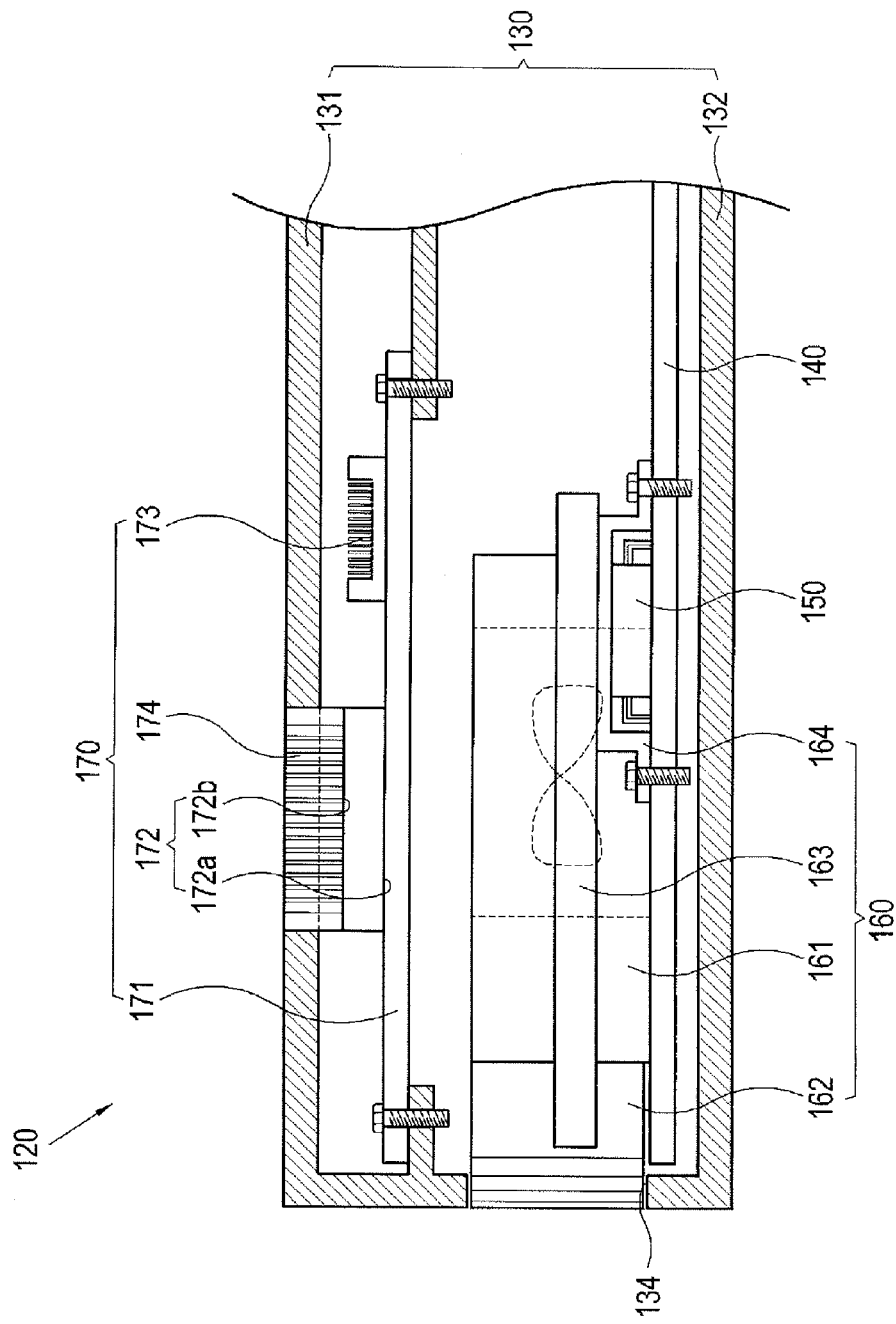
FIG. 4 is a sectional view of a part of the computer body illustrated in FIG. 3.

As illustrated in FIG. 4, the computer body 120 may include a casing 130, a circuit board 140, a heat generating element 150, a main cooling unit 160 and an auxiliary cooling unit 170.

Figure 2:
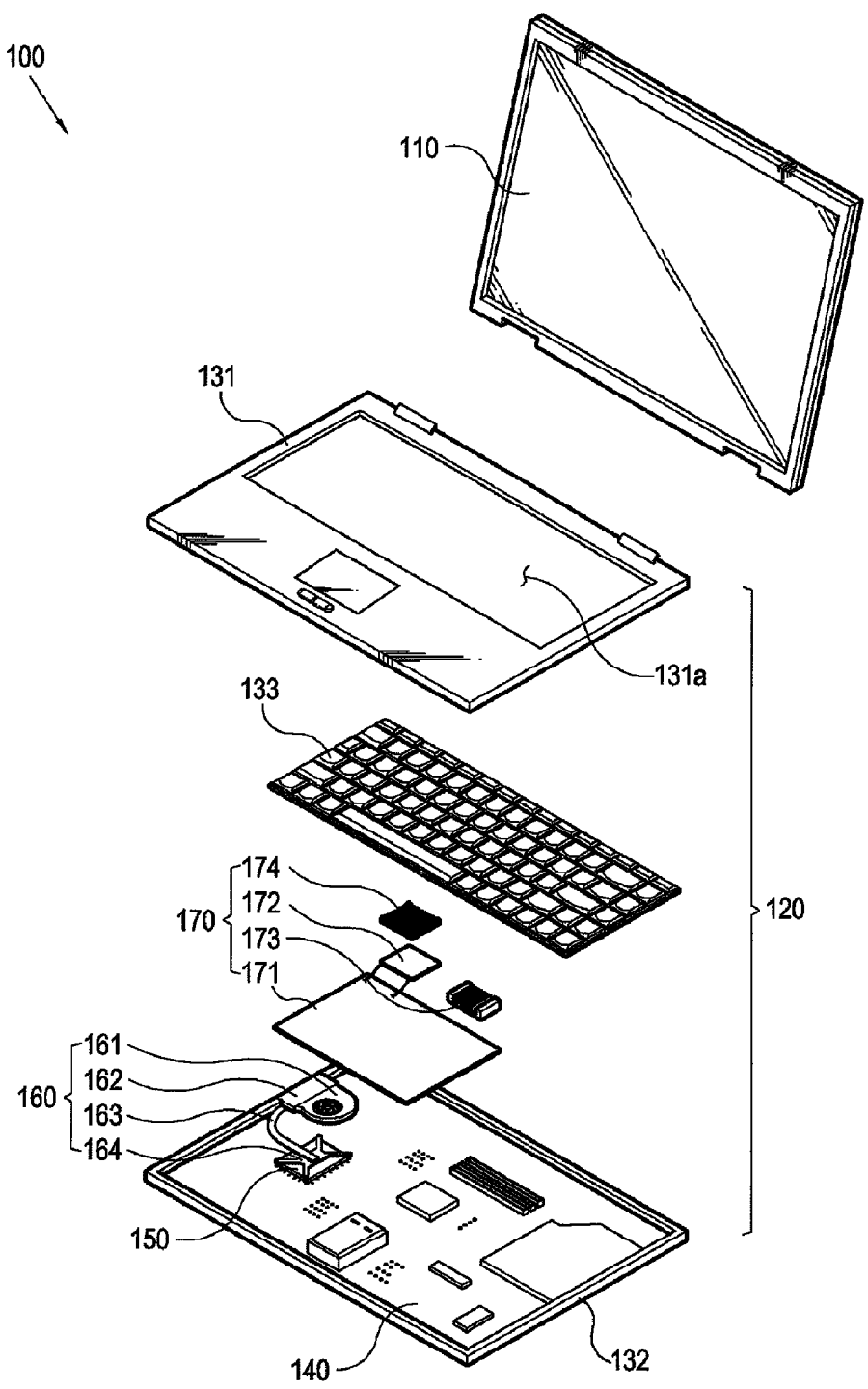
FIG. 2 is an exploded perspective view of a computer according to an exemplary embodiment of the present general inventive concept.

As illustrated in FIGS. 2 and 4, the casing 130 may include an upper casing 131 which forms an upper appearance of the computer body 120 and can have a keyboard opening 131a, a lower casing 132 which is coupled to the upper casing 131 and forms a lower appearance of the computer body 120, a keyboard unit 133 which is coupled to the upper casing 131 and exposed to the outside of the casing 130 through the keyboard opening 131a and a fan opening 134 which is formed in a side wall of the casing 130.

Figure 3:
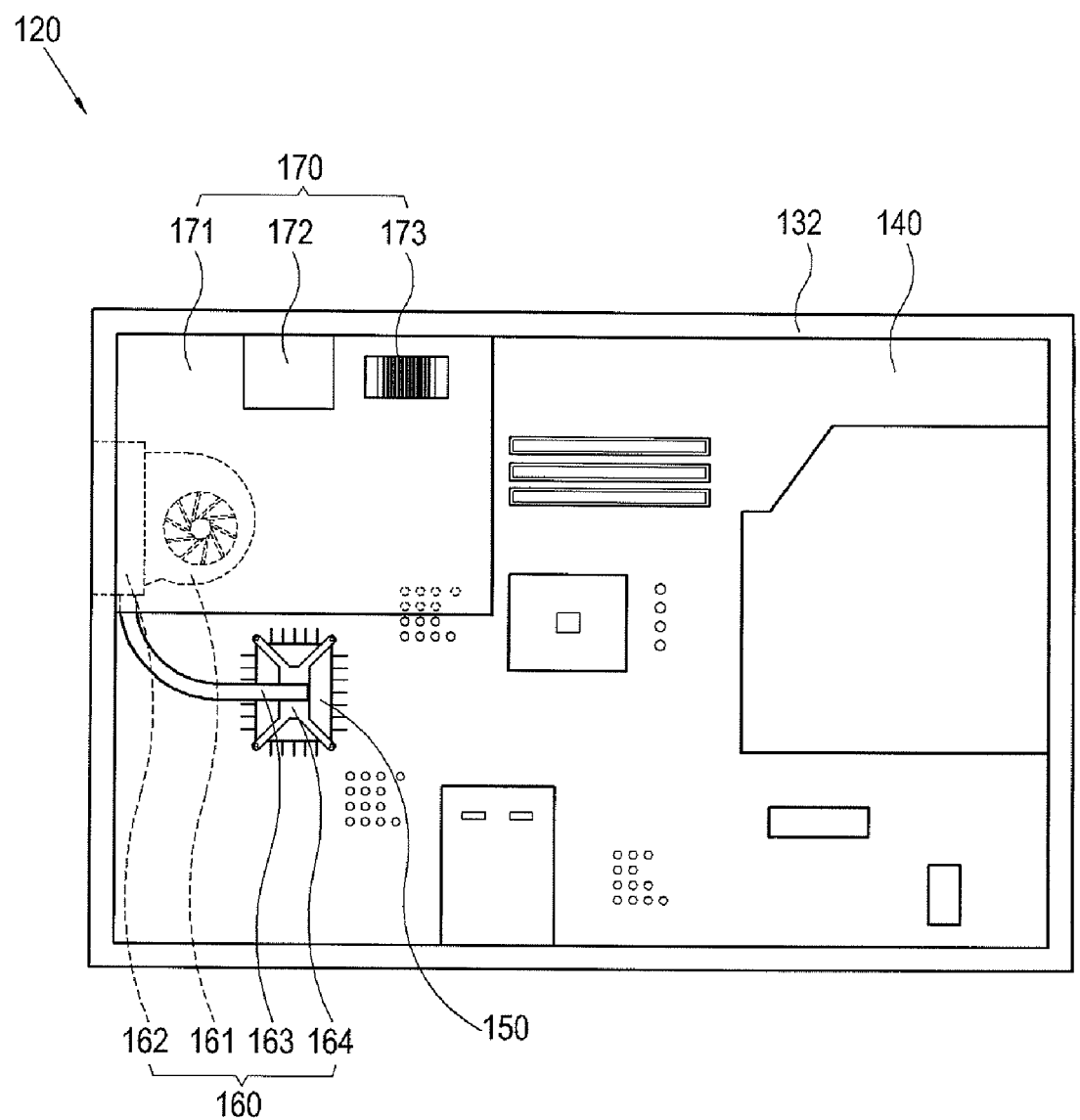
FIG. 3 is a plane view illustrating an inside of a computer body illustrated in FIG. 2.

As illustrated in FIGS. 2 to 4, the circuit board 140 can be provided inside of the casing 130, and various electronic parts, which include at least one heat generating element 150, can be mounted thereon.

As illustrated in FIGS. 2 to 4, the heat generating element 150 can be mounted on the circuit board 140 and may include at least one of a central processing unit (CPU), a graphics processing unit (GPU), a memory controller hub (MCH), and an input output controller hub (IOCH). The heat generating element 150 can generate a significant amount of heat when the computer 100 operates.

As illustrated in FIGS. 2 to 4, the main cooling unit 160 can be disposed between the fan opening 134 of the casing 130 and the heat generating element 150 and can cool heat which is generated from the heat generating element 150, and may include a fan 161, a heat radiating fin 162, a heat pipe 163, and a contact plate 164.

As illustrated in FIGS. 3 and 4, the fan 161 cools air introduced inside of the casing 130 through the fan opening 134 from the outside and provides the air to the heat generating element 150 or radiates heat which is generated from the heat generating element 150 outside of the casing 130 through the fan opening 134. The fan 161 may include a cross-flow fan, an axial fan or the like.

As illustrated in FIGS. 2 to 4, the heat radiating fin 162 is coupled to the fan 161 and exposed to the outside through the fan opening 134, to thereby exchange inside air of the casing 130 with outside air of the casing 130 and cool the heat generated from the heat generating element 150.

As illustrated in FIGS. 3 and 4, the heat pipe 163 is disposed between the heat radiating fin 162 and the heat generating element 150 and guides the heat generated from the heat generating element 150 to the heat radiating fin 162.

As illustrated in FIGS. 3 and 4, the contact plate 164 is coupled to an end part of the heat pipe 163 and supports the coupling of the heat pipe 163 and the heat generating element 150.

As illustrated in FIGS. 2 to 4, the auxiliary cooling unit 170 is provided inside of the casing 130 and additionally cools inside air of the casing 130 directed to the main cooling unit 160. It is preferable but not necessary that the auxiliary cooling unit 170 may be disposed in a space between the main cooling unit 160 and the casing 130 and provided in a path through which inside air of the casing 130 flows.

The auxiliary cooling unit 170 may include a heat absorbing member 171, a cooling element 172, a heat radiating member 173, and a heat sink 174. Alternatively, the auxiliary cooling unit 170 may not include the heat radiating member 173 and the heat sink 174, if only the auxiliary cooling unit 170 can prevent overload according to overcooling of the cooling element 172.

Accordingly, the auxiliary cooling unit 170 can cool inside air of the computer 100 and can lower a temperature of the air inside of the computer 100 to less than a room temperature of the place where the computer 100 is used, thereby improving cooling performance of the main cooling unit 160 and stability of a system of the computer 100.

As illustrated in FIGS. 2 to 4, the heat absorbing member 171 can be formed with a plate shape and installed in a path through which the inside air of the casing 130 flows so as to exchange heat of the inside air of the casing 130. The heat absorbing member 171 may be installed on an upper part of the main cooling unit 160, but alternatively, may be installed in other parts thereof as necessary.

As described above, the absorbing member 171 can have a plate shape and can be installed in a path through which the inside air of the casing 130 flows, to thereby enlarge an heat exchanging area for the inside air of the casing 130.

As illustrated in FIG. 4, the cooling element 172 can be coupled with the heat absorbing member 171 and cools the inside air of the casing 130, to additionally cool the heat generated from the heat generating element 150. The cooling element 172 may include a peltier element.

The peltier element 172 employs the peltier phenomenon that one of two different metals connected to each other absorbs heat and the other one thereof radiates heat as current flows therein. Thus, the peltier element 172 according to the present general inventive concept, as illustrated in FIGS. 2 and 4, may include a heat absorbing surface 172a which comes in contact with the heat absorbing member 171 and absorbs heat from the heat absorbing member 171, and a heat radiating surface 172b which has at least a part exposed to the outside of the casing 130 and radiates heat outside of the casing 130. The peltier element 172 may be provided as a thermal electric cooler (TEC) including a power supply cable which is connected to a power supply 181 (see FIG. 5).

Herein, the heat absorbing surface 172a may be adhered to the heat absorbing member 171 by an adhesive, such as a thermal epoxy having a high thermal conductivity.

On the other hand, in a state where the keyboard unit 133 is coupled to the upper casing 131, a small gap can be generated between the upper casing 131 and the keyboard unit 133 within the keyboard opening 131a. A part of the heat radiating surface 172b may be exposed outside of the casing 130 through the small gap.

It has been described above that the cooling element 172 includes a peltier element, but alternatively, the cooling element 172 may include a small mechanical or chemical cooler known in the art.

Accordingly, temperature of air inside of the computer 100 can be easily reduced less than a room temperature of the place where the computer 100 is used with a relatively small space inside of the casing 130.

As illustrated in FIGS. 2 to 4, the heat radiating member 173 may include a plurality of fins and may be coupled with the heat absorbing member 171. Further, the heat radiating member 173 may be coupled to a planar surface of the heat absorbing plate 171 which is coupled with the cooling element 172.

As illustrated in FIGS. 2 and 4, the heat sink 174 is coupled to the heat radiating surface 172b of the cooling element 172 and at least a part thereof is exposed outside of the casing 130 and additionally cools heat of the heat radiating surface 172b.

Accordingly, the computer system can be prevented from being unstable by the heat generated from the heat radiating surface 172b due to overcooling of the cooling element 172.

Figure 5:
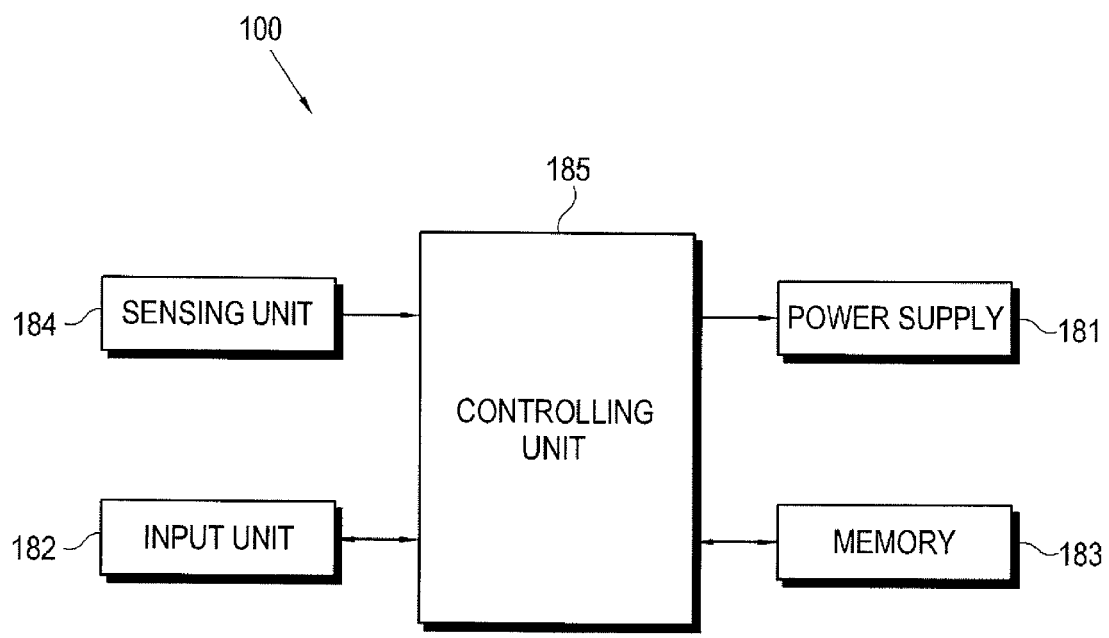
FIG. 5 is a control block diagram of the computer illustrated in FIG. 2.

As illustrated in FIG. 5, the computer 100 may further include the power supply 181, an input unit 182, a memory 183, a sensing unit 184 and a controlling unit 185. Herein, the power supply 181, the input unit 182, the memory 183, the sensing unit 184 and the controlling unit 185 may be provided in the computer body 120, but alternatively, may be provided in the display 110 as necessary.

The power supply 181 supplies power to the cooling element 172 according to control of the controlling unit 185.

The input unit 182 is inputted with and transmits a limit temperature of the heat radiating surface 172b, at which condensation according to the overcooling of the cooling element 172 is not generated, that is, a reference temperature of the heat radiating surface 172b to the controlling unit 185 so as to prevent the condensation.

The memory 183 stores the information inputted through the input unit 182 and the memory 183 provides related information to the controlling unit 185 if the controlling unit 185 demands.

The sensing unit 184 includes a temperature sensing sensor which senses temperature of the heat radiating surface 172b. Alternatively, the sensing unit 184 may include a humidity sensing sensor so as to directly sense generation of condensation according to the operation of the cooling element 172.

Figure 6:
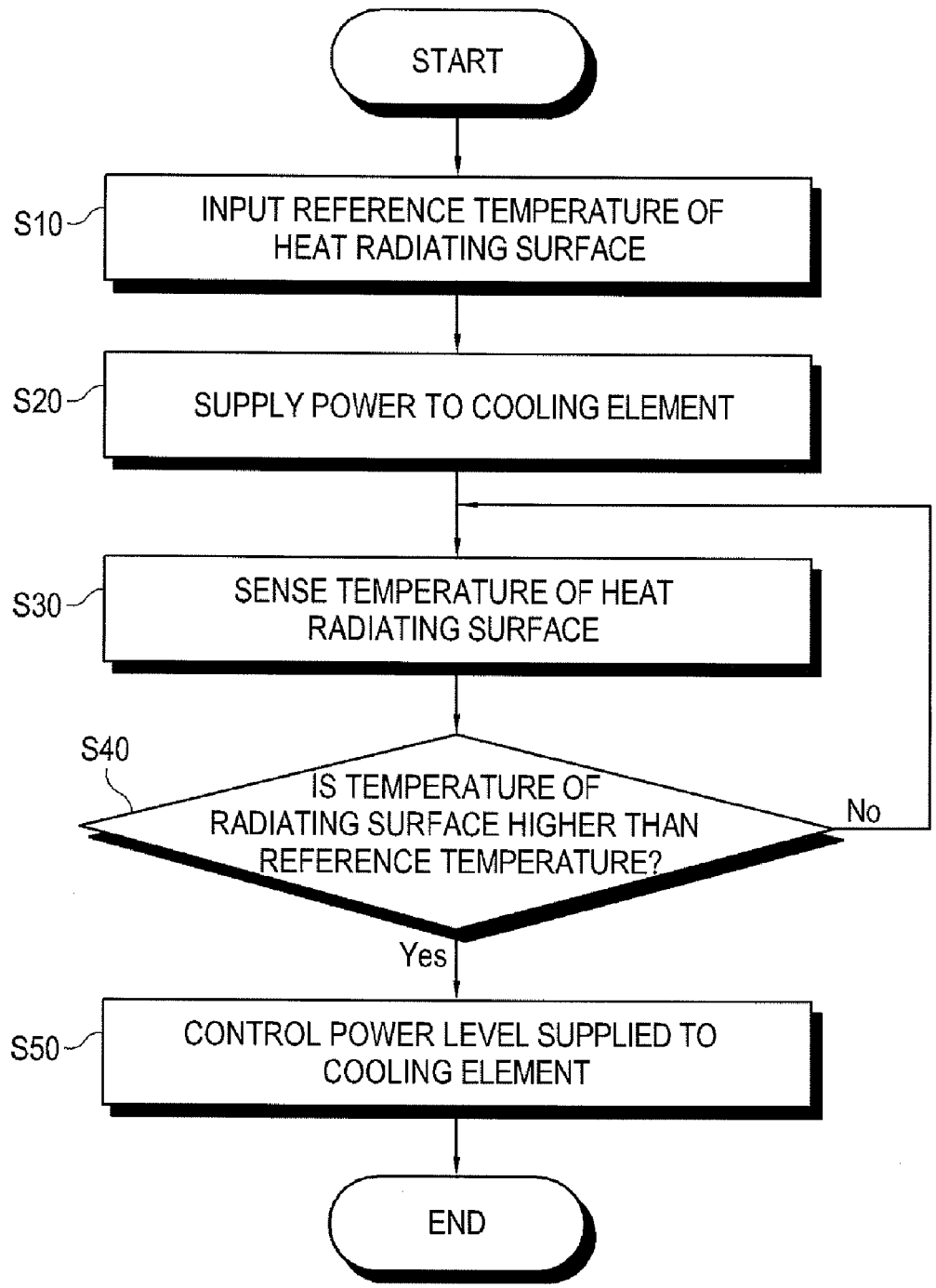
FIG. 6 is a flow chart of an auxiliary cooling unit illustrated in FIG. 4.

As illustrated in FIGS. 5 and 6, the controlling unit 185 controls the power supply 181 so that the temperature of the heat radiating surface 172b can be maintained within the reference temperature on the basis of the sensed temperature from the sensing unit 184. The controlling unit 185 may determine whether the sensed temperature of the heat radiating surface 172b from the sensing unit 184 is higher than the reference temperature. If it is determined that the sensed temperature is higher than the reference temperature, the controlling unit 185 may control the power supply 181 so that the temperature of the heat radiating surface 172b can be maintained within the reference temperature by lowering a power level which is supplied to the cooling element 172.

Accordingly, the temperature of the heat radiating surface 172b can be maintained within the reference temperature by the controlling unit 185, to thereby prevent the condensation due to overcooling of the cooling element 172 and prevent short circuit due to the condensation.

Further, the controlling unit 185 may control the power supply 181 to control voltage or current which is applied to the cooling element 172 so that the power level which is supplied to the cooling element 172 can be controlled. Accordingly, a cooling level of the cooling element 172 can be easily controlled by the controlling unit 185.

The above description has been made to a portable computer, such as a notebook computer, but its configuration can be applied to all kinds of computers, such as a desktop computer, which have a cooling unit to cool heat generated from a heat generating element inside of the body.

With this configuration, a process of cooling the heat generated from the heat generating element 150 in the computer 100 according to the present general inventive concept will be described, referring to FIGS. 2 to 6.

First, the limit temperature of the heat radiating surface 172b at which the condensation is not generated on the heat absorbing surface 172a of the cooling element 172, that is, the reference temperature of the heat radiating surface 172b is inputted through the input unit 182 in operation S10.

Thereafter, power is supplied to the cooling element 172 by the power supply 181 in operation S20.

The heat generated from the heat generating element 150 is guided to the heat radiating fin 162 via the contact plate 164 and the heat pipe 163.

The fan 161 cools the heat radiating fin 162 to generate heat exchange between inside and outside air of the casing 130, thereby primarily cooling the heat generated from the heat generating element 150.

On the other hand, heat which is continuously generated from the heat generating element 150 and other heat generating parts as the computer system operates is transferred inside of the casing 130. The heat is exchanged through the heat absorbing member 171 of the auxiliary cooling unit 170.

That is, the cooling element 172 which comes in contact with the heat absorbing member 171 absorbs heat from the heat absorbing member 171, and the heat absorbing member 171 becomes cooler, and accordingly, the inside air of the casing 130 becomes cooler.

Accordingly, the inside air of the casing 130 directed to the fan 161 of the main cooling unit 160 can be effectively cooled by the auxiliary cooling unit 170.

While the heat absorbing surface 172a of the cooling element 172 which comes in contact with the heat absorbing member 171 is cooled, the heat radiating surface 172b is heated. At this time, the heat which is absorbed through the heat absorbing member 171 is radiated outside of the casing 130 by the heat radiating member 173 and the heat sink 174.

On the other hand, as power is continuously supplied to the cooling element 172, condensation may be generated by an overcooling thereof. In order to prevent this, the sensing unit 184 senses the temperature of the heat radiating surface 172b so as to sense whether the condensation is generated or not in the heat absorbing surface 172a considering that as the temperature of the heat radiating surface 172b of the cooling element 172 increases, the temperature of the heat absorbing surface 172a thereof decreases, and vice versa, in operation S30.

The controlling unit 185 determines whether the temperature of the heat radiating surface 172b which is sensed from the sensing unit 184 is higher than the reference temperature in operation S40. If it is determined that the temperature of the heat radiating surface 172b is higher than the reference temperature, the controlling unit 185 lowers the power level which is supplied to the cooling element 172 and controls the power supply 181 so that the temperature of the heat radiating surface 172b can be maintained within the reference temperature in operation S50. If it is determined that the temperature of the heat radiating surface 172b is not higher than the reference temperature, the controlling unit 185 senses the temperature of the heat radiating surface 172b again in operation S30.

Accordingly, the temperature of the heat radiating surface 172b is maintained within the reference temperature by the controlling unit 185, to thereby prevent condensation due to the overcooling of the cooling element 172.

It has been described above that the controlling unit 185 determines whether the temperature of the heat radiating surface 172b is higher than the reference temperature, but alternatively, the controlling unit 185 may control the power supply 181 so that its power can be supplied to the cooling element 172 within a predetermined power level at which condensation is not generated to the heat absorbing surface 172a.

With this configuration, air inside of the casing 130 directed to the main cooling unit 160 is cooled by the auxiliary cooling unit 170, thereby improving cooling efficiency of the main cooling unit 160.

As described above, according to the present general inventive concept, inside air of the computer is additionally cooled by the auxiliary cooling unit and temperature of the inside air is lowered to less than a room temperature of a place where the computer is used, thereby improving cooling efficiency of the main cooling unit.

Further, a size of the main cooling unit is minimized and noises caused by the main cooling unit decrease by the improved cooling efficiency of the main cooling unit.

Furthermore, a stability of the computer system is improved by the improved cooling efficiency of the main cooling unit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A computer, comprising:
a casing in which an opening is formed;
a heat generating element which is provided inside of the casing;
a main cooling unit which is disposed between the opening of the casing and the heat generating element and cools heat which is generated from the heat generating element; and
an auxiliary cooling unit which is provided inside of the casing and additionally cools inside air directed to the main cooling unit,
wherein the auxiliary cooling unit comprises:
a heat absorbing member which is installed in a path, through which the inside air directed from the heat generating element to the main cooling unit flows, so as to exchange heat of the inside air; and
a cooling element which is coupled with the heat absorbing member and cools the inside air the casing.

2. The computer according to claim 1, wherein the auxiliary cooling unit further comprises:
a heat radiating member which include a plurality of fins and is coupled to the heat absorbing member.

3. The computer according to claim 1, wherein the heat absorbing member comprises a heat absorbing plate having a plate shape.

4. The computer according to claim 1, wherein the cooling element comprises a peltier element.

5. The computer according to claim 4, wherein:
the peltier element comprises:
a heat absorbing surface which comes in contact with the heat absorbing member and absorbs heat from the heat absorbing member, and
a heat radiating surface of which at least a part is exposed to the outside of the casing and radiates heat; and
the computer further comprises a power supply which supplies power to the peltier element.

6. The computer according to claim 5, further comprising:
a sensing unit which senses a temperature of the heat radiating surface; and
a controlling unit which controls the power supply so that the temperature of the heat radiating surface can be maintained within a reference temperature on the basis of the sensed temperature from the sensing unit.

7. The computer according to claim 5, wherein the auxiliary cooling unit further comprises a heat sink which is coupled to the heat radiating surface of the cooling element.

8. The computer according to claim 1, wherein the main cooling unit comprises:
a fan;
a heat radiating fin which is coupled with the fan and exposed through the opening; and
a heat pipe which is disposed between the heat radiating fin and the heat generating element and guides heat which is generated from the heat generating element to the heat radiating fin.

9. The computer according to claim 1, wherein the auxiliary unit is disposed in a space between the main cooling unit and the casing.

10. The computer according to claim 1, wherein the computer comprises a portable computer.

11. The computer according to claim 1, wherein the computer comprises a portable computer.

12. The computer according to claim 2, wherein the computer comprises a portable computer.

13. The computer according to claim 3, wherein the computer comprises a portable computer.

14. The computer according to claim 4, wherein the computer comprises a portable computer.

15. The computer according to claim 5, wherein the computer comprises a portable computer.

16. The computer according to claim 6, wherein the computer comprises a portable computer.

17. The computer according to claim 7, wherein the computer comprises a portable computer.

18. The computer according to claim 8, wherein the computer comprises a portable computer.

19. The computer according to claim 9, wherein the computer comprises a portable computer.

20. A computer, comprising:
a casing to support a heat generating element, the casing defining at least one fan opening;
a main cooling unit, comprising:
a fan to exchange air inside the casing with air outside the casing through the at least one fan opening,
a heat pipe connected to the heat generating element to conduct heat away therefrom, and
a heat radiating fin coupled to the heat pipe to radiate the conducted heat; and
an auxiliary cooling unit, comprising:
a heat absorbing member to absorb a heat of the air inside the casing, and
a cooling member to cool the air inside the casing,
wherein the heat absorbing member of the auxiliary cooling unit is installed in a path, through which the inside air directed from the heat generating element to the main cooling unit flows, so as to exchange heat of the air inside the casing, and
wherein the cooling member is a peltier element connected to the heat absorbing member to cool the air inside the casing.

21. The computer according to claim 20, further comprising:
a power supply to provide power to the auxiliary cooling unit; and
a controller,
wherein the controller controls a power supplied to the auxiliary unit to prevent formation of condensation due to overcooling by the cooling member.

22. The computer according to claim 20, wherein the controller controls the power supplied to the auxiliary unit according to a predetermined reference temperature.

23. The computer according to claim 20, wherein the controller controls the power supplied to the auxiliary unit according to a predetermined reference voltage or current.

24. The computer according to claim 20, wherein the auxiliary cooling unit further comprises:
a heat radiating member connected to the heat absorbing member to radiate a heat therefrom, and
a heat sink connected to the cooling member and having at least a portion exposed to an outside of the casing, to cool heat off the cooling member.

25. The computer according to claim 20, wherein the heat generating element is a circuit board or an element thereof.

26. The computer according to claim 20, wherein the auxiliary cooling unit is disposed on an air path of the main cooling unit and the at least one fan opening.

27. The computer according to claim 20, wherein the auxiliary cooling unit is disposed such that it cools an air entering the fan of the main cooling unit.

28. The computer according to claim 20, wherein the auxiliary cooling unit is disposed such that it cools an air exiting the fan towards an inside of the casing.

29. The computer according to claim 20, wherein the main cooling unit introduces air from an outside of the casing and toward the heat generating unit, and radiates heat away from the heat generating element through the heat pipe and the heat radiating fin.

30. The computer according to claim 20, wherein the auxiliary cooling unit absorbs a heat of the inside air through the heat absorbing member, and cools the inside air through the cooling member by a peltier effect.

31. The computer according to claim 22, further comprising a sensor to sense a temperature of the auxiliary cooling unit, wherein the controller controls the power supplied to the auxiliary cooling unit according to a comparison of the sensed temperature and the predetermined reference temperature.

32. The computer according to claim 22, further comprising a sensor to sense generation of condensation on the cooling member, and the controller reduces the power supplied to the auxiliary cooling unit if condensation is detected.

33. A computer, comprising:
a casing;
a heat generating element disposed within the casing;
a first cooling unit to cool the heat generating element; and
a second cooling unit to cool an air inside the casing according to a temperature inside of the casing,
wherein the second cooling unit comprises a heat absorbing member which is installed in a path, through which the inside air directed from the heat generating element to the first cooling unit flows, so as to exchange heat of the inside air, wherein a peltier element is connected to the heat absorbing member to cool the air inside the casing.

34. The computer according to claim 33, wherein the casing comprises an opening and the first cooling unit controls air inside the casing to communicate with air outside the casing through the opening.

35. The computer according to claim 34, wherein the second cooling unit is not disposed on a flow path of the inside air between the opening and the heat generating element.

36. The computer according to claim 33, wherein the first cooling unit operates according to an operation of the heat generating element, and the second cooling unit selectively operates according to the temperature.

37. The computer according to claim 33, wherein the temperature comprises at least one of an inside temperature, a temperature of the second cooling unit, and a comparison thereof.

38. A computer, comprising:

a casing;

a heat generating element disposed within the casing;

a first cooling unit to cool the heat generating element; and a second cooling unit to cool an air inside the casing to a temperature that is below a temperature outside of the casing, wherein the second cooling unit comprises:

a heat absorbing member which is installed in a path, through which the inside air directed from the heat generating element to the first cooling unit flows, so as to exchange heat of the inside air; and a cooling element which is coupled with the heat absorbing member and cools the inside air of the casing.

* * * * *